No. 688,392. Patented Dec. 10, 1901.
H. V. CONRAD.
VALVE FOR COMPRESSORS.
(Application filed Aug. 3, 1901.)
(No Model.) 2 Sheets—Sheet 1.
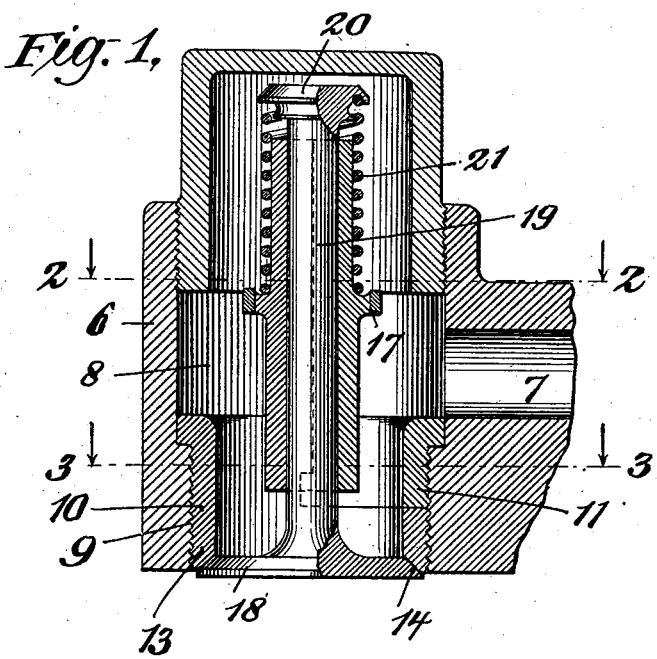
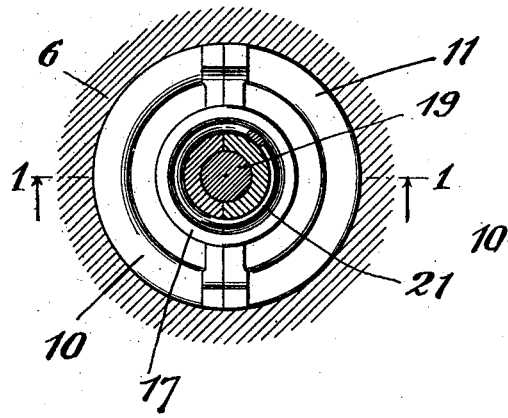
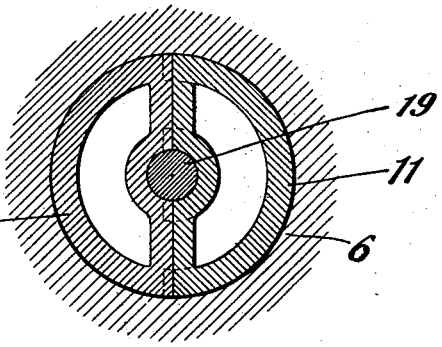
WITNESSES:
INVENTOR
Hugh V. Conrad
BY
Chapin & Maynard
his ATTORNEYS No. 688,392. Patented Dec. 10, 1901.
H. V. CONRAD.
VALVE FOR COMPRESSORS.
(Application filed Aug. 3, 1901.)
(No Model.) 2 Sheets—Sheet 2.
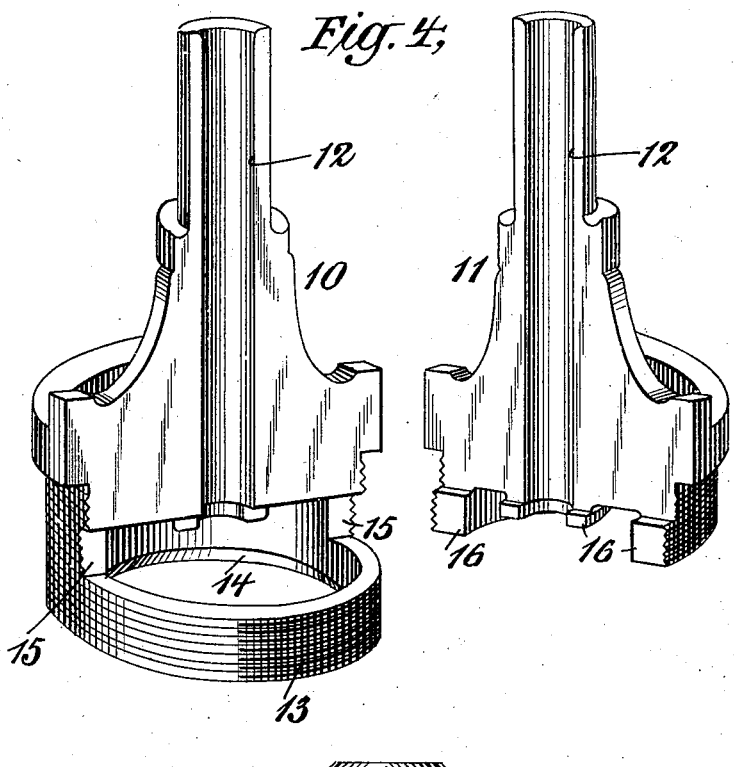
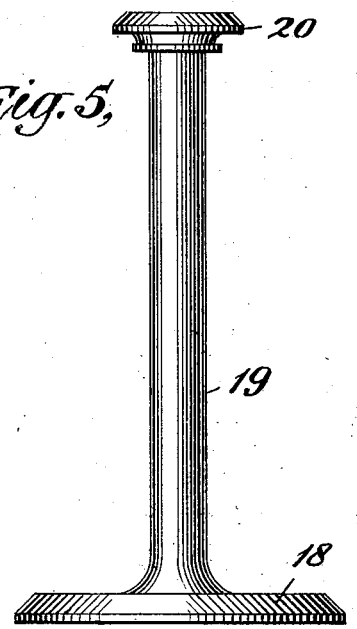
WITNESSES: INVENTOR
Harry Doss. Hugh V. Conrad
Benj. E. Teale. BY Chapin & Hayward
his ATTORNEYS
THE NORRIS PETERS CO., PHOTO-LITHO., WASHINGTON, D. C.

UNITED STATES PATENT OFFICE.

HUGH V. CONRAD, OF TARRYTOWN, NEW YORK, ASSIGNOR TO RAND DRILL COMPANY, OF NEW YORK, N. Y., A CORPORATION OF NEW YORK.

VALVE FOR COMPRESSORS.

SPECIFICATION forming part of Letters Patent No. 688,392, dated December 10, 1901.

Application filed August 3, 1901. Serial No. 70,700. (No model.)

*To all whom it may concern:*

Be it known that I, HUGH V. CONRAD, a citizen of the United States of America, and a resident of Tarrytown, in the county of Westchester and State of New York, have invented certain new and useful Improvements in Valves for Compressors, of which the following is a specification, reference being had to the accompanying drawings, forming a part thereof.

My invention consists in providing a split bushing, each member of which is adapted to partially embrace the valve-stem of a valve and to form a guide therefor, one member of which is provided with an extension having a valve-seat therein to which the valve carrying the said valve-stem is fitted.

The main object of my invention is to provide a bushing having a guide therein for a valve-stem and having a valve-seat integral therewith into which a valve-disk, stem, and stem-head formed integrally in one piece may be inserted to be carried and guided thereby.

My invention further consists in certain novel details of construction and combination of parts, as will hereinafter more fully appear, and other advantages will also appear hereinafter.

I will now proceed to describe a valve embodying my invention and will then point out the novel features in claims.

In the drawings, Figure 1 is a central transverse sectional elevation of a valve embodying my invention, together with a portion of the casing of a compressor. Figs. 2 and 3 are views in horizontal or transverse section of the same, the sections being taken substantially upon the plane of the lines 2 2 and 3 3 of Fig. 1. Fig. 4 is a detached view in perspective of my improved bushing with its two members separated or disassociated. Fig. 5 is a view in side elevation of a valve-disk, stem, and head formed in one integral piece.

In Fig. 1 a portion of the casing of a compressor is shown and designated by the reference character 6. The casing is provided with suitable inlet-passage 7 and chamber 8. The chamber 8 is interiorly screw-threaded at 9 to receive a bushing. The bushing herein comprises two members, one designated by the reference character 10 and the other by the reference character 11. These two members are clearly illustrated in Fig. 4 of the drawings, in which view they appear in perspective, and their general form and shape will be quite plain by a reference to such figure. The said members each carry one-half 12 of a guide for the stem of a valve-disk, and one of the said members—namely, that one designated by the reference character 10—is provided with an extension 13, having a valve-seat 14 therein, and to which is fitted the valve-disk carrying the said stem. The bushing member 10 is provided with suitable recesses 15, and the bushing member 11 is provided with corresponding projections 16, so that when the two members are assembled they will be interlocked. Each of the members 10 and 11 carries one-half of a set of screw-threads in addition to the screw-threaded extension 13, which is carried by the member 10. The bushing as a whole is fitted to the chamber 8 of the casing, and the screw-threaded portion thereof engages the screw-threaded portion 9 of the casing before referred to. When thus in position in the casing, the two members of the bushing are securely locked together and cannot move independently of each other. For convenience in holding the parts together before they are inserted into position a ring 17 is employed, which surrounds the upper portion of the said bushing, forming the valve-stem guide. This ring will also serve to prevent the upper end of the said bushing from springing apart after the said bushing has been inserted into place should there be any tendency so to do.

The valve-disk 18, stem 19, and head 20, which are clearly illustrated in Fig. 5 of the drawings and separated from the bushing, are preferably formed integrally in one piece or the various parts are rigidly secured together, so that, in effect, they are one integral piece. The said valve-disk, stem, and head may be inserted into position with the valve-disk 18 in proximity with its seat 14, the stem 19 in the guide 12, and the head 20 above or beyond the end of the said guide by first disassembling the bushing members, by then inserting the stem and head through the extension 13 of the disk member 10 until the parts are in their proper relative positions, by then reassembling said bushing members, and lastly by inserting ring 17 in place, so as to prevent an accidental relative displacement of the said members. A spring 21 is provided, the said spring being of the compression type and bearing at one side against a shouldered portion of the said bushing and at the other side against the under side of the said stem-head. The normal tendency of the spring 21 is to keep the valve-disk 18 up to its seat 14. The spring 21 may be inserted into place by winding it over the stem-head 20, the spring being rotated, and thereby gradually drawing itself into position as if it were a screw turning upon the stem-head 20 as a nut.

It is exceedingly advantageous to supply the valve-disk, stem, and head in one integral piece where the valve is to be employed as an inlet-valve for a compressor, and particularly where the valve is to be employed as the inlet-valve on the high-pressure side of a compound air-compressor. This is for the reason that it has been found in actual practice that if the valve-disk, stem, and head be made of separate parts they are very likely to become loose, owing to the pounding and jarring which they receive. It is also desirable that the guide for the stem and the valve-seat be in one integral piece, for otherwise it is exceedingly hard to procure and maintain the correct alinement so necessary for a proper working of the valve. In my invention hereinbefore set forth I have attained these results in a very simple and effective manner.

It will of course be understood that various modifications of my device may be resorted to within the spirit and scope of my invention, and I do not wish, therefore, to be limited only to the precise construction herein shown and described.

What I claim is—

1. In a valve for compressors or the like, the combination with a valve-disk, stem, and stem-head, of a split bushing comprising two members, each having a portion adapted to partially embrace the said valve-stem, and together to form a guide therefor, one of the said members provided with an extension having a valve-seat therein for the said valve-disk.

2. In a valve for compressors or the like, the combination with a valve-disk, stem and stem-head, of a split bushing comprising two interlocked members, each having a portion adapted to partially embrace the said valve-stem, and together to form a guide therefor, one of the said members provided with an extension having a valve-seat therein for the said valve-disk.

3. In a valve for compressors or the like, the combination with a valve-disk, stem and stem-head, of a split bushing comprising two members 10 and 11, each of the members screw-threaded at one portion throughout an arc of substantially one hundred and eighty degrees, and each having a portion 12 forming substantially one-half of a guide for said stem, and one of said members provided with a screw-threaded extension 13, having a valve-seat 14 therein for the said valve-disk.

4. The combination with the casing of a compressor or the like, said casing having a screw-threaded portion, of a split bushing comprising two members together provided with a threaded portion adapted to engage the screw-threaded portion of the said casing, each of said members having a portion adapted to partially embrace a valve-stem, and together to form a guide therefor, and one of said members provided with an extension having a valve-seat therein, together with a combined valve-disk, stem and head.

5. The combination with the casing of a compressor or the like, said casing having a screw-threaded portion, of a split bushing comprising two interlocked members together provided with a threaded portion adapted to engage the screw-threaded portion of the said casing, each of said members having a portion adapted to partially embrace a valve-stem, and together to form a guide therefor, and one of said members provided with an extension having a valve-seat therein, together with a combined valve-disk, stem and head.

HUGH V. CONRAD.

Witnesses:
J. ALBERT EARL,
WILLIAM S. BARNUM.